J. B. Sargent,
Sewing Machine Caster.

No. 103,782.      Patented May 31, 1870.

Witnesses.
John H. Shumway
A. J. Tibbits

Joseph B. Sargent
Inventor
By his Attorney
Thos. E. Earle

UNITED STATES PATENT OFFICE.

JOSEPH B. SARGENT, OF NEW HAVEN, CONNECTICUT.

IMPROVEMENT IN SEWING-MACHINE CASTERS.

Specification forming part of Letters Patent No. 103,782, dated May 31, 1870.

*To all whom it may concern:*

Be it known that I, JOSEPH B. SARGENT, of New Haven, in the county of New Haven and State of Connecticut, have invented a new Improvement in Sewing-Machine Casters; and I do hereby declare the following, when taken in connection with the accompanying drawings and the letters of reference marked thereon, to be a full, clear, and exact description of the same, and which said drawings constitute part of this specification, and represent, in—

Figure 1:
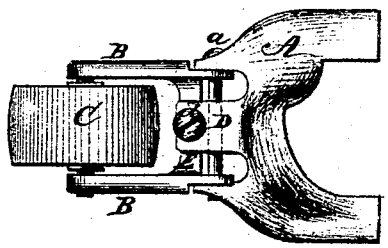
Figure 2:
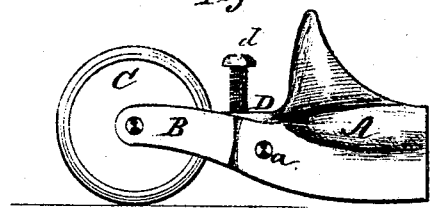

Figure 1, a top view; Fig. 2, a side view, the adjusting-screw arranged perpendicularly; and in Fig. 3, a side view, the adjusting-screw arranged horizontally.

This invention relates especially to the caster for which Letters Patent were granted to Sargent & Co., as the assignees of Benjamin F. Ryder, dated April 12, 1870, but may be applied to casters of other construction. In this class of casters it is difficult to so apply them to the machine that the wheel will always stand in the proper relative position, inasmuch as a slight variation in the leg or foot of the machine will change the relative position of the wheel.

The object of this invention is an adjustment whereby this difficulty may be overcome; and it consists in hanging the wheel in a yoke which is pivoted or hinged to the yoke that extends around the leg or foot of the machine, and combining therewith an adjusting-screw, whereby the wheel may be elevated or depressed, as required.

A is the yoke, fitted to the leg of the machine, and secured thereto in the manner set forth in the patent before referred to.

B B are two arms of a yoke within which the wheel C is hung in the usual manner for casters, and this yoke is pivoted or hinged to the yoke A at *a*.

Figure 3:
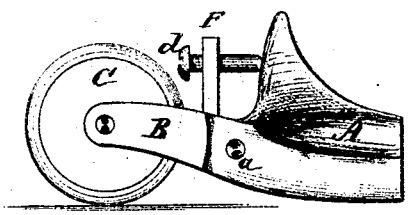

From the yoke A an arm, D, extends out, through which a screw, *d*, is placed, bearing upon a bar, E, in the yoke B, so that by turning down the said screw the wheel will be depressed, and vice versa; or a vertical arm, F, may be formed upon the yoke, as seen in Fig. 3, and the screw *d* passed therethrough to bear against the yoke A, and, as in the first arrangement, the turning in of the screw depresses the wheel, and vice versa.

By thus hanging the wheel and combining therewith the adjusting-screw the wheel may be set at the required elevation, although the yoke A may be necessarily in different positions on different legs.

I claim as my invention—

The yoke B, supporting the wheel C, pivoted or hinged to the yoke A, and combined with the set-screw *d* for the adjustment of the wheel, substantially as set forth.

JOSEPH B. SARGENT.

Witnesses:
A. J. TIBBITS,
J. H. SHUMWAY.